June 11, 1946.     G. G. GILPIN     2,401,822
CAR COUPLER SUPPORT AND POSITIONING DEVICE
Filed Oct. 18, 1943     3 Sheets-Sheet 1
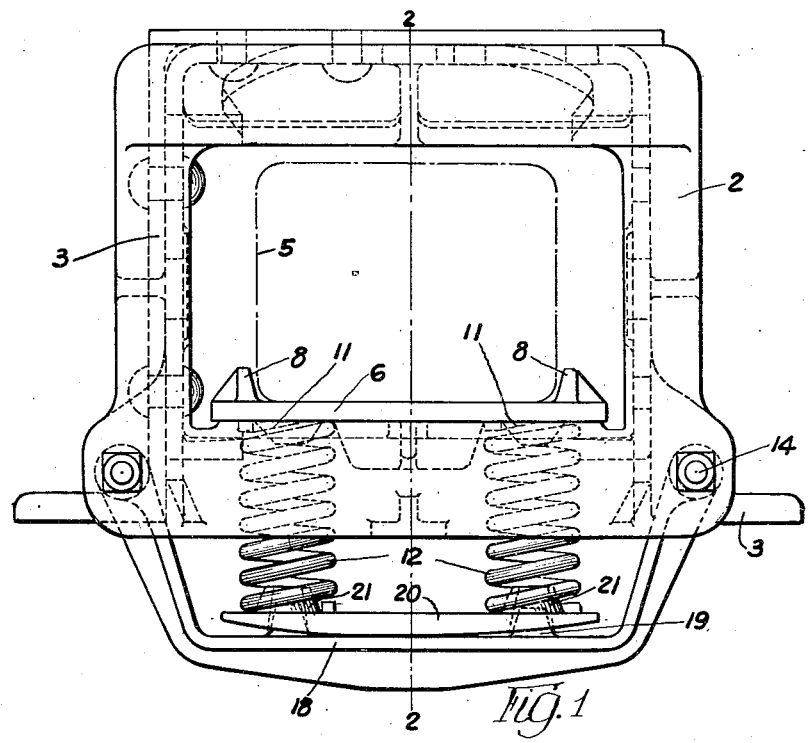
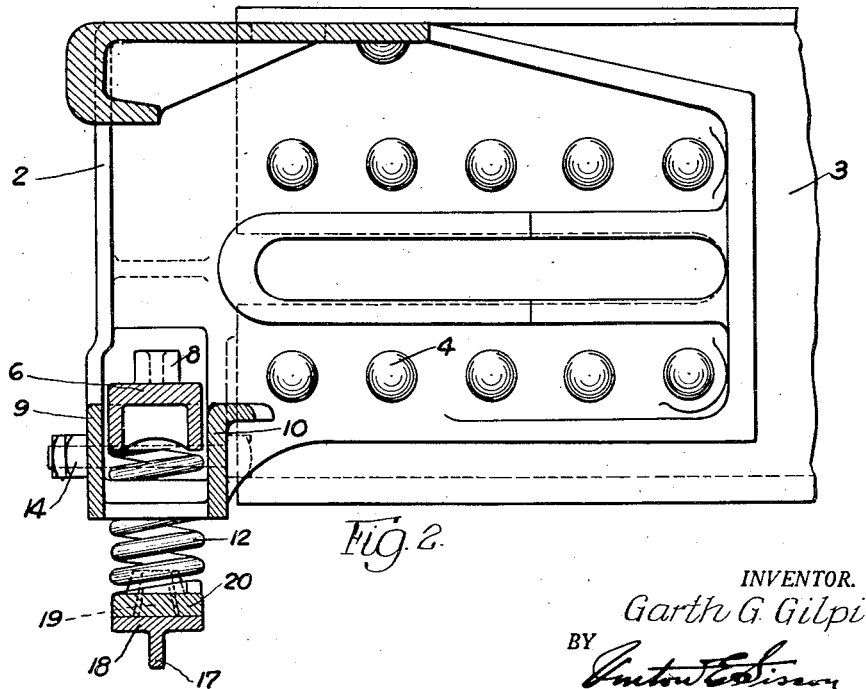
INVENTOR.
Garth G. Gilpin,

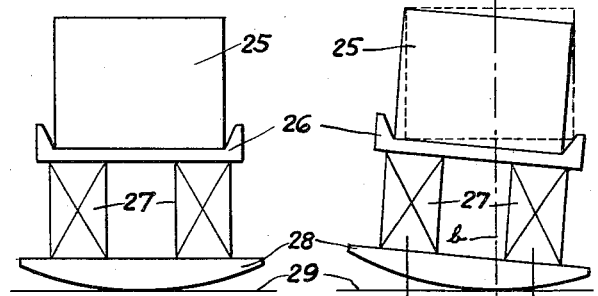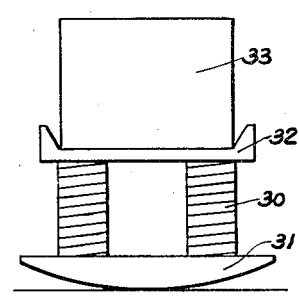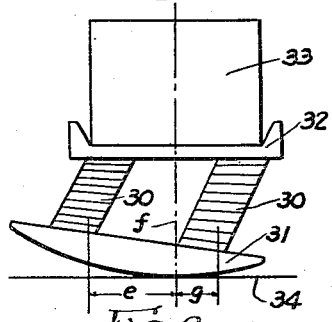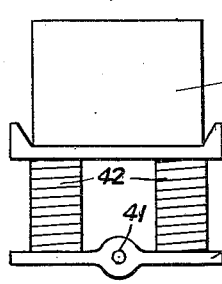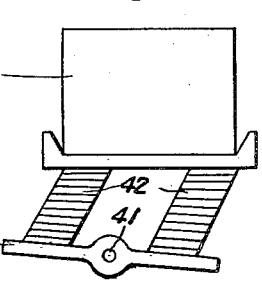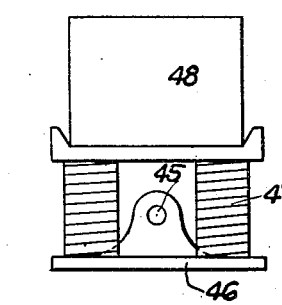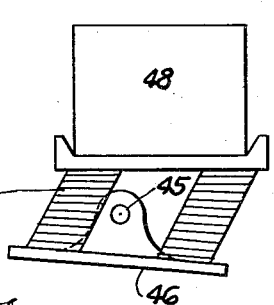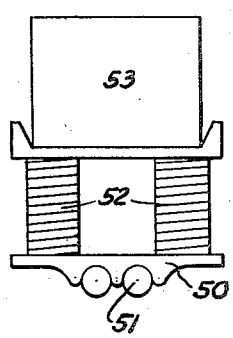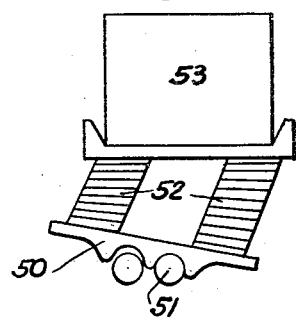

June 11, 1946.  G. G. GILPIN  2,401,822
CAR COUPLER SUPPORT AND POSITIONING DEVICE
Filed Oct. 18, 1943  3 Sheets-Sheet 3

INVENTOR.
Garth G. Gilpin,
BY

Patented June 11, 1946

2,401,822

UNITED STATES PATENT OFFICE 2,401,822

CAR COUPLER SUPPORT AND POSITIONING DEVICE

Garth G. Gilpin, Chicago, Ill., assignor to Standard Railway Equipment Manufacturing Company, Chicago, Ill., a corporation of Delaware Application October 18, 1943, Serial No. 506,777

7 Claims. (Cl. 213—61)

This invention relates to improvements in railway cars and more particularly to improvements in means for supporting the outer end of a railway car coupler adjacent its "head."

My present invention is an improvement over Patent No. 1,923,433 granted to me on August 22, 1933, and Patent No. 2,308,032 granted to James S. Swann on January 12, 1943, both of which patents are assigned to the same assignee to which this invention and application will be assigned.

One of the objects of the invention is to support a railway car coupler upon a device which permits the coupler to move horizontally and vertically with the coupler of another car when coupled thereto as the couplers adjust themselves to the curves and unevenness of the track, as well as causes the coupler to return to normal coupling range when free to do so; for instance, when a coupler supported by my device is uncoupled while the railway car is upon a curved track.

Another object of the invention is to provide a resilient means in a carrier for supporting the outer end of a coupler at a desired elevation during service movements of the car, but which means permits downward and/or lateral movement of the coupler when an additional live load is applied such as when two coupled cars are pulled over a track elevation, hump, vertical curve in the track, or around a curve, and wherein said carrier, when free to do so, will return the coupler to its normal height and simultaneously to a position at least adjacent the center of the car within coupling range.

Another object of the invention is to reduce the service stresses in the coupler by providing a resilient coupler carrier thereby permitting the outer end of the coupler to move vertically so that the center line of coupled couplers will be nearer a straight line, thus reducing the resultant force in the coupler shank. When the force ceases, as when the cars are uncoupled, the resilient carrier returns the coupler to its normal vertical position, which is an essential in accepted railroad operation when coupling railway cars.

Another object is to resiliently support the coupler by a pair of spaced apart springs and provide means below the coupler to increase the compression upon one spring and decrease the compression on the other spring upon lateral movement of the coupler so that the unequal compression on the springs urges the coupler toward normal central position when the coupler is free to be so moved; i. e., when the coupler is not coupled to another coupler. Another object is to position the springs and coupler so that when the coupler is in normal position; i. e., in the middle of the car, the weight thereof is equally distributed between the springs and to provide means to shift the weight of the coupler unequally between the springs as the coupler is moved laterally. In the various types of rockers illustrated the lateral movement of the coupler causes the weight thereof to be unequally distributed around the pivot or rocking line of the rocker (thereby forcing one end of the rocker down and the other end thereof up) which unequal distribution urges the rocker to assume a normal balanced position and return the coupler to normal central position.

A further object of my improved resilient coupler support and coupler centering device is to prevent jar in the coupler, caused by uneven track and the movement of the coupler on the carrier, from being transmitted by the coupler to adjacent car parts, and furthermore, to reduce the friction and wear between the associated parts.

Another object is to provide a resilient means which cushions and centers the coupler by maintaining the carrier in adjustment with the coupler, and which may be readily and quickly assembled or taken apart; is very light in weight and economical to manufacture.

A still further object of the invention is the provision of an emergency coupler support which functions in the event of failure of any of the component parts of the cushioning or centering device.

Still another object is to provide a cushion carrier and centering device which will remain intact and in proper functioning position while the car is being unloaded upside down in, for example, an unloading machine so that it will be capable of functioning when the car is returned to normal upright position.

Still other objects and advantages of my invention will appear in the following description thereof.

Throughout the specification, wherever the term "coupler" is used, it is understood to mean a standard railway car coupler wherein no provision is made for the coupler to rotate around its longitudinal axis.

In the instant invention and the modifications thereof some of the elements roll, some rock and some do both simultaneously, therefore, applicant has used in the specification and claims the word rock (and the derivations thereof) with the understanding that, for the purpose of describing these inventions, the terms include a rocking and/or rolling action.

Referring now to the accompanying drawings forming part of this application and wherein like reference characters indicate like parts:

Fig. 1 is a front elevation, illustrative of a typical application of my device to a railway car when the device is in normal position.

Fig. 2 is a vertical section on the line 2—2 of Fig. 1.

Figs. 3 and 4 are diagrams illustrating movements and functions of the elements of my device.

Figs. 5 and 6 are diagrams similar to Figs. 3 and 4 wherein resilient means are provided to support and center the coupler.

Figs. 7 and 8 show a modification wherein the rocker comprises a substantially horizontal member mounted upon a pivot rigidly fixed to the car adjacent the middle thereof.

Figs. 9 and 10 show a modification similar to that shown in Figs. 7 and 8 wherein the supporting pivot for the rocker is above the bearing surfaces of the springs upon the rocker, thus providing an inverted T-shaped pendulum.

Figs. 11 and 12 show a modification similar to that shown in Figs. 7 and 8 wherein the rocker is mounted upon a pair of spaced pivots fixed to the car and substantially equi-distant on opposite sides of the medial plane of the car.

Figs. 13 to 16 inclusive are diagrammatic illustrations of the modifications wherein the rocker having a lower race is supported upon a member attached to the car by a pair of springs equidistant on opposite sides of the medial plane of the car.

Figure 17:
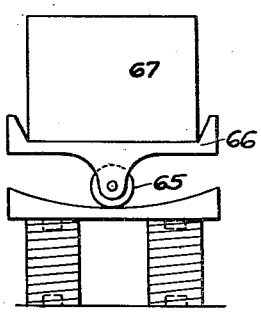
Figure 18:
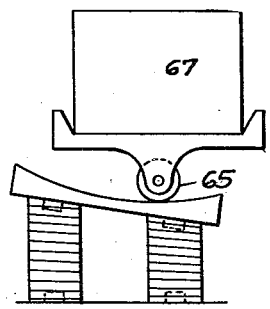

Figs. 17 and 18 show a modification wherein a roller is pivotally attached to a coupler carrier, which roller engages a curved surface of a member supported by spaced springs upon a rigid part of the car.

Figures 19, 20, 21:
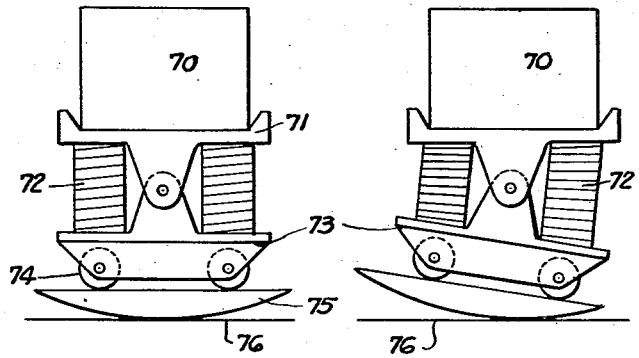

Figs. 19 to 21 inclusive are diagrams showing a modification of the device wherein the springs are supported by a wheeled carriage running upon the rocker.

In Figs. 1 and 2 of the drawings I have shown the preferred form of my invention applied to a railway car wherein the striking casting is shown generally at 2 and which is attached to the center sill 3 of the car as by the rivets 4 for holding the same to the underframe of the car. The car coupler, the shank of which is shown in outline at 5, rests upon the carrier 6 and is retained in central position thereon by the upstanding lugs 8 so as to move laterally with the coupler. The carrier is adapted to move between the spaced apart walls 9 and 10 of the striking casting 2 to restrict the movement of the carrier longitudinally of the car, but which walls, of course, permit movement of the carrier and coupler laterally of the car. These walls 9 and 10 also provide an emergency coupler support in case of breakage or loss of any of the parts of my device. Furthermore, if the coupler is forced excessively downwardly the coupler engages the walls 9 and 10 and relieves the springs 12 of all force except the small force required to compress the springs until the carrier engages these walls 9—10. The under surface of the carrier 6 is provided with a pair of spaced apart, downwardly tapering knobs 11—11 about which the upper ends of the correspondingly spaced helical springs 12—12 seat and are thus held in position against the under surface of the carrier to provide a cushioned support therefor. These spring seat knobs 11—11 may be formed on the bottom surface of the coupler shank itself and thus do away with the carrier, but since the device is designed for application to most any form of coupler and as an accessory thereto, it is not practical to have to weld or otherwise attach such knobs to the coupler to apply the device to a car. The lower outer corners of the spaced apart walls 9 and 10 of the striking casting are provided with registering holes for the bolts 14. These bolts attach the upper outer ends of the yoke which supports my device from the striking casting or other support, and provides means for assembling or removing my device or any parts thereof from the car. A stiffening web 17 is formed centrally about the yoke 18 for strength and rigidity. The upper surface of the yoke 18 is provided with a pair of spaced upwardly tapering knobs 19, the axes of which are spaced apart substantially the same distance as that of the knobs 11. A rocking spring seat 20 (hereinafter called a rocker 20) rests upon the upper surfaces of the horizontal portion of the yoke 18 and is provided with spaced embossments 21 which are preferably identical in shape with the knobs 11, except that they are provided with tapered axial holes to receive the knobs 19 rather loosely, but yet sufficiently close to hold the rocker 20 in place when it rocks due to service movements of the car or functions to center the coupler. The lower ends of the springs 12 are adapted to extend about the embossments 21 for holding them in position thereon. The springs extend between the carrier 6 and the rocker 20. The lower surface of the rocker is preferably arcuate on a relatively long radius so that as the coupler shank moves the carrier to one side or another the rocker rocks upon its seat and thereby shifts the line of contact between the rocker and its seat away from the middle of the car.

Any desired means may be used to keep the ends of the blocks or springs in proper relationship with the carrier and rocker, respectively. Also any desired means may be used to prevent the rocker from slipping upon its support.

It is obvious that in lieu of springs, rubber blocks, or other resilient means, may be applied with like effect. Also experiments have shown that a device as illustrated and thus far described functions admirably even though one of the resilient means is longer than the other.

The modification shown in Figs. 1 and 2 is diagrammatically illustrated in Figs. 3 and 4 which show an application of the invention as a centering device only (and not cushioning device) and wherein instead of the springs 12 solid blocks 27 are used and the coupler 25 is supported by the carrier 26 upon the solid blocks 27 which rest upon the rocker 28, which, in turn, is supported by the rocker seat 29, or other means, rigidly secured to the car.

When a car to which my device is applied is coupled to another car it is immaterial whether the coupler 25 is centrally or otherwise disposed, but when the coupler 25 associated with my device is not coupled to another car, it is then desirable that the coupler 25 be returned to substantially the middle of the car or to within coupling range of another coupler.

Fig. 3 shows the position of the component parts of the device when the coupler is in normal central position whether or not the weight of the coupler is supported by the device. When the coupler 25 is moved laterally to the right the component parts of the device assume the position shown in Fig. 4 whether the coupler 25 is supported by the device or not. It will be noted that when the coupler moves laterally the line of contact between the rocker 28 and its support is shifted from the middle of the car.

When the coupler associated with my device is uncoupled from the coupler of another car, or in other words, when the force which has moved the coupler laterally ceases to exist, the weight of the coupler is then supported by the device. If the coupler assumes the position shown in full lines in Fig. 4 the weight of the coupler will be distributed substantially equally by the carrier 28 upon both blocks 27. As shown in Fig. 4, the distance $a$, between the engagement of the left block 27 with the rocker 28 from the line of contact $b$ between the rocker 28 and its support is greater than the distance $c$ between the engagement of the right block 27 with the rocker 28 and the line of contact $b$ between the rocker 28 and its support, providing unequal leverage or leverage differential between the engagement of the respective blocks with the rocker and line of contact $b$ between the rocker and its support 29. In other words, the difference between the moment on one side of the line $b$ (that is, the force times the lever arm $a$) and the moment on the other side of the line $b$ (that is, the force times the lever arm $c$) provides a restoring moment tending to return the coupler and device to normal coupling range when free to do so. This difference in leverage or restoring moment urges the rocker 28 to rock back toward its normal central position, as shown in Fig. 3, and take the carrier and coupler with it. When the coupler is moved to the left a similar action occurs.

If, during normal operation (for instance, the attachment of the coupler to the car and shock absorber), the coupler assumes the position shown in dotted lines in Fig. 4, then the major portion of the weight of the coupler will be upon the left block 27 and the leverage between the engagement of the left block 27 with the rocker 28 and the line of contact between the rocker 28 and its support will cause the rocker to rock back to substantially its normal central position, as shown in Fig. 3, and take the carrier and coupler with it.

The device was actually tried out with a real full size coupler, and other parts, with wooden blocks 27 and it was shown to function as indicated. The Association of American Railroads requires a 1¾" lateral movement of the coupler either way from the middle of the car. The test also showed that before the coupler moves its required 1¾" laterally the weight of the coupler was supported by the carrier at one corner only, as shown in dotted lines in Fig. 4.

Figs. 5 and 6 show a construction similar to that shown in Figs. 3 and 4, but wherein coil or helical springs 30 are used so that as the rocker 31 rocks upon its supporting surface to the right, the left end of the rocker is raised and the right end is lowered, thus decreasing the compression of the right or leading spring and increasing the compression of the left or trailing spring, and the unequal compression or pressure differential of the springs urges the device and coupler toward normal central position. The springs are normally under a slight compression due to the weight of the coupler. Furthermore, the springs keep the carrier 32 in contact with the entire width of the coupler shank 33, and thereby reduce friction and wear between these parts. The coil or helical springs have the additional advantage that upon further lateral movement of the coupler, the spring will be distorted and thus provide additional force to return the coupler to normal central position. This distortion of a spring for this purpose is covered by my prior Patent No. 1,923,433. By "distorted" I mean that the axis of the coil is moved away from its right angle or normal relation to the base of the spring.

In actual practice the center of forces of the coil springs 30 upon their support (the rocker 31) will be near the lower edges (right edges in Fig. 6) of the springs so that distance $e$ from $f$ will be greater than distance $g$ from $f$, thus providing a leverage differential which cooperates with the aforementioned pressure differential to urge said rocker and said coupler to normal position when free to do so. $f$ is the line of contact between the rocker 31 and the support 34.

Figs. 7 to 12 inclusive are diagrammatic illustrations of other modifications of my device wherein the associated parts of the car and the device itself are similar to the structure illustrated in Figs. 1 and 2.

Figs. 7 and 8 show a modification wherein the rocker comprises a substantially horizontal member 40 mounted upon a pivot 41 rigidly fixed to the car adjacent the middle thereof. The pivot 41 is substantially midway between the bearing surfaces of the springs 42 on the rocker 40. When the coupler 43 moves laterally the rocker 40 rocks upon the pivot, as shown in Fig. 8, so that the compression of the trailing spring is increased, while the compression on the leading spring is decreased, so that the unequal compression or pressure differential on the springs causes the device to return toward normal central position and take the coupler with it when free to do so; i. e., when the coupler is uncoupled from another coupler.

Figs. 9 and 10 show a modification similar to that shown in Figs. 7 and 8 wherein the supporting pivot 45 for the rocker 46 is above the bearing surfaces of the springs 47 upon the rocker, thus providing an inverted T-shaped pendulum. Fig. 10 shows the relative position of the associated parts of this modification when the coupler 48 has moved laterally and how in this position the trailing spring is compressed more than the leading spring.

Figs. 11 and 12 show a modification similar to that shown in Figs. 7 and 8 wherein the rocker 50 is mounted upon a pair of spaced pivots 51 fixed to the car and substantially equidistant on opposite sides of the medial plane of the car. The springs 52 are also substantially equidistant on opposite sides of the medial plane of the car. In other words, the springs are on opposite sides of both pivots.

When the coupler 53 and device is in normal central position the rocker 51 is stabilized upon both pivots, but when the coupler moves laterally, as for instance, to the right, the rocker shifts to the right pivot and the left or trailing spring is under more compression than the right or leading spring. The weight of the coupler 53 is then transmitted to the rocker at points unequally distant on opposite sides of the right pivot providing unequal leverage, which urges the device and coupler toward normal central position when the coupler is free to be so moved.

Figs. 13 to 16 inclusive are diagrammatic illustrations of the modifications wherein a rocker having a lower race 55 is supported upon a member 56 attached to the car by a pair of springs 57 equidistant on opposite sides of the medial plane of the car. The coupler 58 is supported by a carrier which is provided with means to make it move laterally with the coupler. The carrier is provided with an upper race 59. A roller 60 is positioned between and engages said races midway between the springs when the device is in normal central position; that is, when the coupler is in the middle of the car. As the coupler moves laterally the roller rolls between the races and shifts the weight of the coupler 68 unequally upon the springs, which inequality, i. e., the difference in the amount of compression upon the two springs, urges the coupler toward normal central position when the coupler is free to be so moved.

I prefer to make the lower race concave so that as the roller moves laterally the lowering of the adjacent end of the rocker is compensated for by the convexity of the race and the roller actually moves in a horizontal plane whereby the coupler is neither raised nor lowered.

Figure 13:
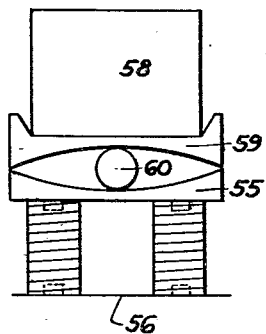
Figure 14:
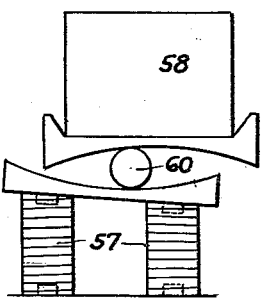

Figs. 13 and 14 show a structure wherein both the upper and lower races are concave.

Figure 15:
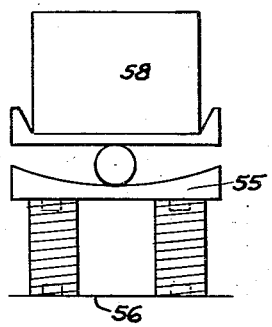
Figure 16:
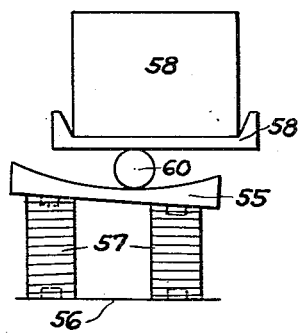

Figs. 15 and 16 show a structure wherein the upper race is flat and the lower race is concave.

Figs. 17 and 18 show the roller 65 pivotally attached to the carrier 66 or the roller may be pivotally attached directly to the coupler 67.

Any anti-slipping means may be used between the roller and races, such as a rack and pinion construction. Furthermore, one of the concave surfaces may be concave both ways (forming a semi-spherical dish) and a ball used as a roller for universal movement of the carrier (and coupler) relative to the rocker. In such a structure the rocker would be restrained from movement longitudinally of the car but the coupler carrier would be free to move a limited amount lengthwise of the car.

Figs. 19, 20 and 21 are diagrammatic illustrations of my device wherein the coupler 70 is supported by a carrier 71 which rests upon the spaced apart springs 72 which transmit the weight of the coupler to the carriage 73. The carriage is pivotally attached to the carrier. The carriage is provided with wheels 74 to provide anti-friction means so that the carriage will run upon the rocker 75 when it is tipped or rocked by the coupler moving laterally. When this device is in normal central position, as shown in Fig. 19, the rollers and springs are spaced equidistant from the medial plane of the car. The line of contact between the rocker 75 and its support 76, as well as the center of gravity of the coupler, are also on the medial plane of the car. In this position the device is stabilized. Figs. 20 and 21 show the coupler having been moved laterally to the right. However, when the coupler is moved laterally in either direction the rocker is tipped and the springs are under unequal compression, thereby producing a force which moves the device and coupler to central normal position when the coupler is free to be so moved. Fig. 21 shows the coupler moved laterally the required 1¾" showing an impracticable position of the parts and showing the necessity of providing means to allow the carriage to move laterally with the coupler; i. e., to move upon the rocker.

The accompanying drawings illustrate the preferred form of the invention, though it is to be understood that the invention is not limited to the exact details of construction shown and described, as it is obvious that various modifications thereof, within the scope of the claims, will occur to persons skilled in the art.

I claim:

1. A cushioning coupler supporting and positioning device for a laterally and vertically movable coupler for a railway car, which car is provided with a part having a portion below the coupler; said device comprising a rocker mountable upon said portion and adapted to rock in a plane transversely of the longitudinal axis of the car, and spaced parallel springs mountable upon said rocker to support said coupler normally equi-distant on opposite sides of the line of contact of said rocker with said portion when said device is applied to the car, the rocker being so shaped that when the coupler is moved in horizontal planes laterally of the longitudinal axis of the car the rocker rocks upon said portion moving its line of contact thereon so that the weight of the coupler is transmitted to said rocker at points unequi-distant on opposite sides of the moved line of contact providing a leverage differential and simultaneously compressing the trailing spring and relieving the leading spring, thus providing a pressure differential between the springs which cooperates with the leverage differential to provide a restoring moment to urge said rocker and said coupler to normal position when free to do so.

2. A cushioning coupler supporting and positioning device for a laterally and vertically movable coupler for a railway car, which car is provided with a part having a portion below the coupler; said device comprising a rocker mountable upon said portion and adapted to rock in a plane transversely of the longitudinal axis of the car, and spaced parallel springs mountable upon said rocker to support said coupler normally equi-distant on opposite sides of the line of contact of said rocker with said portion when said device is applied to the car, the rocker being so shaped that when the coupler is moved in horizontal planes laterally of the longitudinal axis of the car the rocker rocks upon said portion moving its line of contact thereon so that the weight of the coupler is transmitted to said rocker at points unequi-distant on opposite sides of the moved line of contact providing a restoring moment to urge said rocker and said coupler to normal position when free to do so.

3. A coupler supporting and positioning device for a laterally and vertically movable coupler for a railway car, which car is provided with a part having a portion below the coupler; said device comprising a rocker mountable upon said portion and adapted to rock in a plane transversely of the longitudinal axis of the car, and spaced means mountable upon said rocker to support said coupler normally equi-distant on opposite sides of the line of contact of said rocker with said portion when said device is applied to the car, the rocker being so shaped that when the coupler is moved in horizontal planes laterally of the longitudinal axis of the car the rocker rocks upon said portion moving its line of contact thereon so that the weight of the coupler is transmitted to said rocker at points unequi-distant on opposite sides of the moved line of contact providing a restoring moment to urge said rocker and said coupler to normal position when free to do so.

4. A cushioning coupler supporting and positioning device for a laterally and vertically movable coupler for a railway car, which car is provided with a part having a portion below the coupler; said device comprising a rocker mountable upon said portion and adapted to rock in a plane transversely of the longitudinal axis of the car, and spaced parallel resilient means mountable upon said rocker to support said coupler normally equi-distant on opposite sides of the line of contact of said rocker with said portion when said device is applied to the car, the rocker being so shaped that when the coupler is moved in horizontal planes laterally of the longitudinal axis of the car the rocker rocks upon said portion moving its line of contact thereon so that the weight of the coupler is transmitted to said rocker at points unequi-distant on opposite sides of the moved line of contact providing a leverage differential and simultaneously compressing the trailing means and relieving the leading means, thus providing a pressure differential between said means which cooperates with the leverage differential to provide a restoring moment to urge said rocker and said coupler to normal position when free to do so.

5. A cushioning coupler supporting and positioning device for a laterally and vertically movable coupler for a railway car, which car is provided with a part having a portion below the coupler; said device comprising a coupler carrier to support said coupler and move laterally and vertically therewith, a rocker mountable upon said portion and adapted to rock in a plane transversely of the longitudinal axis of the car, and spaced parallel resilient means mountable upon said rocker to support said carrier normally equi-distant on opposite sides of the line of contact of said rocker with said portion when said device is applied to the car, the rocker being so shaped that when the coupler is moved in horizontal planes laterally of the longitudinal axis of the car the rocker rocks upon said portion moving its line of contact thereon so that the weight of the coupler is transmitted to said rocker at points unequi-distant on opposite sides of the moved line of contact providing a restoring moment to urge said rocker, carrier and coupler to normal position when free to do so.

6. A cushioning coupler supporting and positioning device for a laterally and vertically movable coupler for a railway car, which car is provided with a part having a portion below the coupler; said device comprising a rocker mountable upon said portion and adapted to rock in a plane transversely of the longitudinal axis of the car, and spaced parallel resilient means mountable upon said rocker to support said coupler normally equi-distant on opposite sides of the line of contact of said rocker with said portion when said device is applied to the car, the rocker being so shaped that when the coupler is moved in horizontal planes laterally of the longitudinal axis of the car the rocker rocks upon said portion moving its line of contact thereon so that the weight of the coupler is transmitted to said rocker at points unequi-distant on opposite sides of the moved line of contact providing a restoring moment to urge said rocker and said coupler to normal position when free to do so.

7. A cushioning coupler supporting and positioning device for a laterally and vertically movable coupler for a railway car, which car is provided with a part having a portion below the coupler; said device comprising springs adapted to be spaced transversely of the longitudinal axis of the car to support said coupler upon said portion, and means adapted to be cooperatively associated with said springs, said means being so shaped that when the device is applied to the car and the coupler is moved in horizontal planes laterally of the longitudinal axis of the car a pressure differential between said springs and a leverage differential between said springs and their support are caused, which pressure differential and leverage differential cooperate to provide a restoring moment to urge said coupler to normal coupling range.

GARTH G. GILPIN.